United States Patent
Chen et al.

(10) Patent No.: US 9,178,948 B2
(45) Date of Patent: Nov. 3, 2015

(54) METHODS AND APPARATUS FOR SUBSCRIBING TO MULTIMEDIA DELIVERY SERVICES IN A DATA NETWORK

(75) Inventors: An Mei Chen, San Diego, CA (US); Joseph Barone, San Diego, CA (US); Nileshkumar J. Parekh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 11/186,153

(22) Filed: Jul. 20, 2005

(65) Prior Publication Data

US 2006/0112182 A1     May 25, 2006

Related U.S. Application Data

(60) Provisional application No. 60/592,481, filed on Jul. 30, 2004.

(51) Int. Cl.
    *H04L 29/08*    (2006.01)
(52) U.S. Cl.
    CPC ............... *H04L 67/20* (2013.01); *H04L 67/04* (2013.01); *H04L 67/2833* (2013.01); *H04L 67/30* (2013.01); *H04L 67/306* (2013.01); *H04L 67/303* (2013.01)
(58) Field of Classification Search
    CPC .................................................. H04L 67/2833
    USPC ...................... 455/414.2; 379/88.13; 718/104
    See application file for complete search history.

(56) References Cited

U.S. PATENT DOCUMENTS

| 6,615,212 | B1 * | 9/2003 | Dutta et al. ..................... 707/10 |
| 7,103,351 | B2 * | 9/2006 | Chaudhari et al. ......... 455/414.1 |
| 7,289,534 | B1 * | 10/2007 | Bailey et al. .................. 370/468 |
| 7,310,811 | B1 * | 12/2007 | Basso et al. ................... 725/110 |

(Continued)

FOREIGN PATENT DOCUMENTS

| CN | 1396744 A | 2/2003 |
| CN | 1426263 A | 6/2003 |

(Continued)

OTHER PUBLICATIONS

International Search Report—PCT/US05/027020, International Search Authority—European Patent Office, Nov. 16, 2005.

(Continued)

*Primary Examiner* — Grace Park
(74) *Attorney, Agent, or Firm* — The Marbury Law Group, PLLC

(57) ABSTRACT

Methods and apparatus for subscribing to multimedia delivery services in a data network. A method is provided for subscribing to receive a subscription package in a data network. The method includes receiving resource requirements associated with the subscription package, and determining whether or not selected resources are available to meet the resource requirements associated with the subscription package. The method also includes excluding a first portion of services associated with the subscription package, if it is determined that the selected resources fail to meet the resource requirements associated with the subscription package, and subscribing to receive a second portion of services associated with the subscription package, wherein resource requirements of the second portion of services are met by the selected resources.

24 Claims, 7 Drawing Sheets

(56) References Cited

U.S. PATENT DOCUMENTS

| | | |
|---|---|---|
| 2002/0048054 A1* | 4/2002 | Ohata et al. .................. 358/500 |
| 2003/0114148 A1* | 6/2003 | Albertsson et al. ............ 455/414 |
| 2003/0121983 A1* | 7/2003 | Herle ...................... 235/472.01 |
| 2003/0147369 A1* | 8/2003 | Singh et al. ................... 370/338 |
| 2003/0187916 A1 | 10/2003 | Dettinger et al. ............. 709/203 |
| 2004/0030798 A1* | 2/2004 | Andersson et al. ........... 709/232 |
| 2004/0043763 A1* | 3/2004 | Minear et al. ................. 455/419 |
| 2004/0073567 A1* | 4/2004 | Pelon ........................... 707/102 |
| 2004/0109668 A1* | 6/2004 | Stuckman ....................... 386/40 |
| 2004/0116070 A1* | 6/2004 | Fishman et al. ............. 455/3.02 |
| 2004/0139219 A1* | 7/2004 | Radha ........................... 709/234 |
| 2004/0153547 A1* | 8/2004 | Trossen ........................ 709/228 |
| 2004/0176080 A1* | 9/2004 | Chakravorty et al. ...... 455/414.1 |
| 2004/0203648 A1* | 10/2004 | Wong ......................... 455/414.1 |
| 2004/0260774 A1* | 12/2004 | Jensen et al. ................. 709/206 |
| 2005/0005025 A1* | 1/2005 | Harville et al. ............... 709/241 |
| 2005/0010635 A1* | 1/2005 | Schwesig et al. ............. 709/203 |
| 2005/0039178 A1* | 2/2005 | Marolia et al. ................ 717/168 |
| 2005/0130636 A1* | 6/2005 | Dennisson et al. ......... 455/414.2 |
| 2005/0132179 A1* | 6/2005 | Glaum et al. ..................... 713/1 |
| 2005/0155057 A1* | 7/2005 | Wei ................................. 725/38 |
| 2005/0164691 A1* | 7/2005 | Payne ........................... 455/419 |
| 2005/0177853 A1* | 8/2005 | Williams et al. ................ 725/81 |
| 2005/0245243 A1* | 11/2005 | Zuniga ....................... 455/414.3 |

FOREIGN PATENT DOCUMENTS

| | | |
|---|---|---|
| CN | 1498372 A | 5/2004 |
| EP | 1168758 | 1/2002 |
| JP | 2002064785 A | 2/2002 |
| JP | 2003099327 A | 4/2003 |
| JP | 2003259284 A | 9/2003 |
| JP | 2003297015 A | 10/2003 |
| JP | 2003339000 A | 11/2003 |
| JP | 2004048718 A | 2/2004 |
| JP | 2005158157 A | 6/2005 |
| WO | WO 95/26114 | 9/1995 |

OTHER PUBLICATIONS

Written Opinion—PCT/US05/027020, International Search Authority—European Patent Office, Nov. 16, 2005.

International Preliminary Report on Patentability—PCT/US05/027020, IPEA—US, Feb. 18, 2007.

Translation of Office Action in Japanese application 2007-523851 corresponding to U.S. Appl. No. 11/186,153 , citing JP2005158157 dated Nov. 24, 2010.

Taiwan Search Report—TW094125878—TIPO—Dec. 20, 2011.

* cited by examiner

METHODS AND APPARATUS FOR SUBSCRIBING TO MULTIMEDIA DELIVERY SERVICES IN A DATA NETWORK

CLAIM OF PRIORITY UNDER 35 U.S.C. §119

The present Application for Patent claims priority to Provisional Application No. 60/592,481 entitled "METHOD AND APPARATUS FOR A DEVICE TO ACTIVATE AND SUBSCRIBE TO A MULTIMEDIA DELIVERY SERVICE IN A MOBILE RADIO COMMUNICATION SYSTEM" filed Jul. 30, 2004, and assigned to the assignee hereof and hereby expressly incorporated by reference herein.

BACKGROUND

1. Field

Embodiments of the invention relate generally to the operation of content distribution systems, and more particularly, to methods and apparatus for subscribing to multimedia delivery services in a data network.

2. Background

The distribution of services (data and/or other multimedia content) to a large number of devices is a complicated problem. This is especially true for mobile devices that communicate using relatively slow over-the-air communication links and which may have one or more resource limitations, such as limited memory resources. Therefore, it is very important for network administrators and service providers to have a way that allows mobile devices to easily and efficiently subscribe to receive content and/or other network services that will operate on such resource limited devices.

In current content delivery/media distribution systems, subscriptions are typically handled over the Internet via one or more customer sign-up pages, or as in traditional cable and satellite systems, via a telephone call made by the customer to a customer service representative. The sign-up page model may even offer one or more pages that are specifically formatted (i.e., WML, XHTML) for presentation on a mobile device. For example, a device user first needs to launch a data session with a service provider in order to view the service offerings. After selecting an offering for subscription, the user needs to complete one or more forms that are downloaded from the server and rendered on the device. Generally, because the forms are formatted for rendering on the relatively small screen available on the portable device, multiple forms need to be completed. Furthermore, because the entire process is conducted over-the-air, the relatively low transmission speeds make the subscription process very slow. Unfortunately, this approach is essentially just a variation of the Internet sign-up page model and is generally tedious and inefficient when used in conjunction with resource limited portable devices.

Furthermore, current systems offer service packages to a wide range of devices without accounting for the resources available at each device. For example, services that require large amounts of memory are offered to devices with limited memory resources. As a result, the services may not operate properly at the device and may even damage the operation of the device with respect to other services or functions.

Therefore, what is needed is a subscription system that allows a device to easily subscribe to one or more service packages. The system should also operate to prevent the device from subscribing to services that cannot be accommodated by the available resources at the device.

SUMMARY

In one or more embodiments, a subscription system is provided that allows a device to subscribe to multimedia delivery services in a data network. In one embodiment, the system comprises a resource management system that operates to control the subscription process based on the resources available at a device.

In one embodiment, a method is provided for subscribing to receive a subscription package in a data network. The method comprises receiving resource requirements associated with the subscription package, and determining whether or not selected resources are available to meet the resource requirements associated with the subscription package. The method also comprises excluding a first portion of services associated with the subscription package, if it is determined that the selected resources fail to meet the resource requirements associated with the subscription package, and subscribing to receive a second portion of services associated with the subscription package, wherein resource requirements of the second portion of services are met by the selected resources.

In one embodiment, an apparatus is provided for subscribing to receive a subscription package in a data network. The apparatus comprises logic configured to receive resource requirements associated with the subscription package, and logic configured to determine whether or not selected resources are available to meet the resource requirements associated with the subscription package. The apparatus also comprises logic configured to exclude a first portion of services associated with the subscription package, if it is determined that the selected resources fail to meet the resource requirements associated with the subscription package, and logic configured to subscribe to receive a second portion of services associated with the subscription package, wherein resource requirements of the second portion of services are met by the selected resources.

In one embodiment, an apparatus is provided for subscribing to receive a subscription package in a data network. The apparatus comprises means for receiving resource requirements associated with the subscription package, and means for determining whether or not selected resources are available to meet the resource requirements associated with the subscription package. The apparatus also comprises means for excluding a first portion of services associated with the subscription package, if it is determined that the selected resources fail to meet the resource requirements associated with the subscription package, and means for subscribing to receive a second portion of services associated with the subscription package, wherein resource requirements of the second portion of services are met by the selected resources.

In one embodiment, a computer-readable media is provided that comprises instructions, which when executed by a processor, operate to subscribe to receive a subscription package in a data network. The computer-readable media comprises instructions for receiving resource requirements associated with the subscription package, and instructions for determining whether or not selected resources are available to meet the resource requirements associated with the subscription package. The computer-readable media also comprises instructions for excluding a first portion of services associated with the subscription package, if it is determined that the selected resources fail to meet the resource requirements associated with the subscription package, and instructions for subscribing to receive a second portion of services associated with the subscription package, wherein resource requirements of the second portion of services are met by the selected resources.

In one embodiment, at least one processor is provided that is configured to implement a method for subscribing to receive a subscription package in a data network. The method comprises receiving resource requirements associated with the subscription package, and determining whether or not selected resources are available to meet the resource requirements associated with the subscription package. The method also comprises excluding a first portion of services associated with the subscription package, if it is determined that the selected resources fail to meet the resource requirements associated with the subscription package, and subscribing to receive a second portion of services associated with the subscription package, wherein resource requirements of the second portion of services are met by the selected resources.

Other aspects of the embodiments will become apparent after review of the hereinafter set forth Brief Description of the Drawings, Detailed Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein.

DETAILED DESCRIPTION

In one or more embodiments, a subscription system is provided that allows a device to subscribe (and unsubscribe) to multimedia delivery services in a data network. The system is especially well suited for use in wireless network environments, but may be used in any type of wireless and/or wired network environment, including but not limited to, communication networks, public networks, such as the Internet, private networks, such as virtual private networks (VPN), local area networks, wide area networks, long haul networks, or any other type of data network.

The following definitions are used herein to describe one or more embodiments of a subscription system.

Service A service is a sequence of media presentations and represents the smallest element that may be subscribed to in the subscription system. In one embodiment, a service comprises one or more multimedia clips that are delivered to a device for real-time playback or stored at the device for later playback.

Package A package (or "subscription package") is a collection of one or more services that are offered on a subscription basis.

Figure 1:
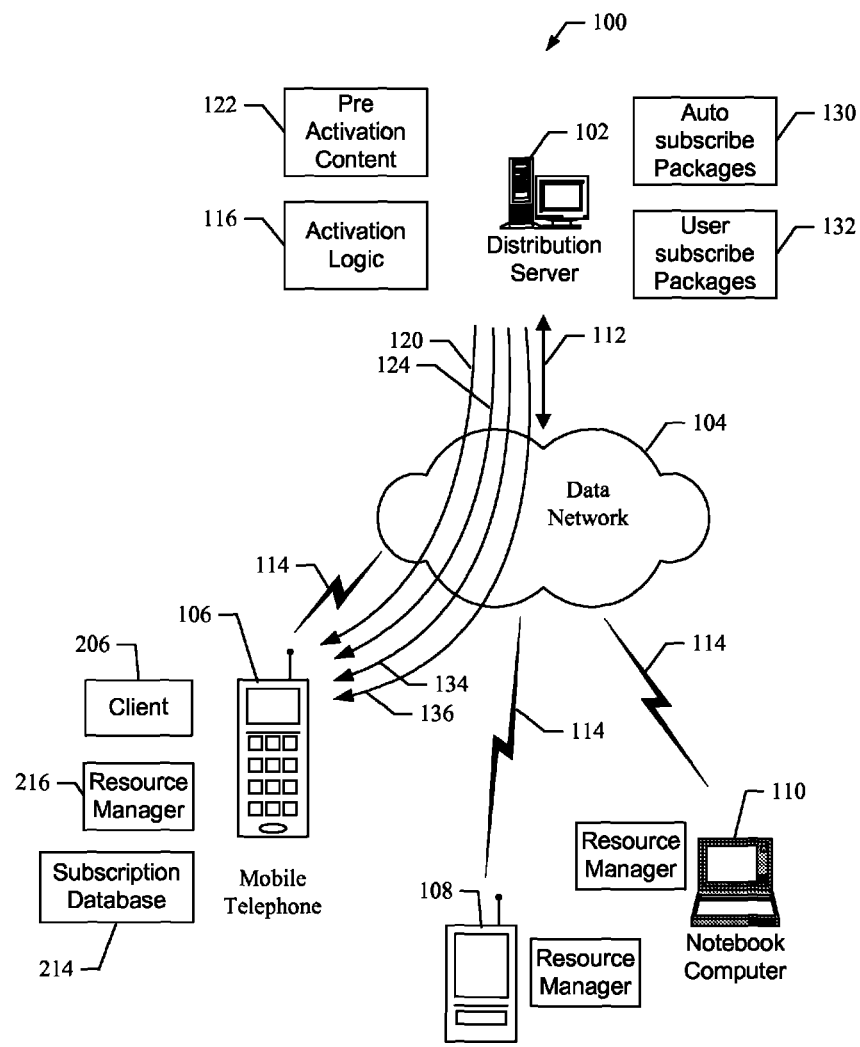
FIG. 1 shows a network that comprises one embodiment of a subscription system.

FIG. 1 shows a network 100 that comprises one embodiment of a subscription system. The network 100 comprises a distribution server 102, a data network 104, and a collection of devices that comprise a mobile telephone 106, a personal digital assistant (PDA) 108, and a notebook computer 110. The data network 104 may be any type and/or combination of wired and/or wireless networks that allow data to be transmitted between the server 102 and the devices. The server 102 communicates with the network 104 via the communication link 112, which may comprise any type of wired or wireless communication channel. The data network 104 provides wireless communication links 114 that allow data to be wirelessly transmitted between the network 104 and the devices 106, 108, and 110. The wireless communication links 114 comprise any type of wireless communication technology. For the remainder of this description, embodiments of the subscription system will be described with reference to the mobile telephone 106. However, the embodiments are equally applicable to the devices 108 and 110 as well.

In one embodiment, an activation process is performed. The activation process registers a device with the distribution server 102, which allows the device to subscribe to receive available services in the form of subscription packages. For example, each subscription package includes selected services that a device may subscribe to receive. The device 106 communicates with activation logic 116 at the server 102 to perform the activation process. As part of the activation process, a client 206 is installed on the device. In one embodiment, the client 206 is downloaded to the device 106 from the distribution server 102, as shown by path 120. In another embodiment, the device manufacturer installs the client 206 on the device 106 during device manufacture.

In one embodiment, the activation process may take a few minutes to complete. For example, during the activation process the client 206 establishes a packet data session, generates an encryption and decryption key pair, downloads system information, and downloads the latest program guide, which describes the available subscription packages. While the activation process is taking place in the background, the distribution server 102 delivers pre-activation content 122 to the device 106 in the form of a video resource file, as shown by path 124. When rendered on the device 106, the pre-activation content 122 provides the user with a preview of the subscription packages available from the distribution server 102. In one embodiment, the pre-activation content 122 is stored on the device 106 during manufacture and rendered during the activation process.

The device 106 comprises a resource manager 216 that operates to manage the resources of the device 106. For example, the device resources comprise memory resources, video resources, user input resources, sound resources, communication resources, positioning resources, or any other type of device resource. In one embodiment, the resource manager 214 operates to manage the device resources so that the device 106 will not be allowed to subscribe to service packages that cannot be accommodated by the available resources. For example, because the device 106 is a portable device, the amount of memory resources may be limited. The resource manager 216 operates to manage the limited memory resources so that the device 106 will not be allowed to subscribe to service packages that will not fit into the available memory.

The device 106 also comprises a subscription database 214 that describes service packages to which the device 106 has subscribed. For example, during the activation process, the device may be automatically subscribed to one or more service packages. Furthermore, after the activation process, the user may initiate the subscription of the device to one or more service packages. The subscription database 214 maintains information about all the services to which the device has subscribed. For example, the subscription database 214 includes information pertaining to the type, size, cost, delivery schedule, resource utilization, or any other information relating to the subscribed services. In one embodiment, the resource manager 216 uses the subscription database 214 to determine what resources are allocated to existing subscriptions and how much of the device's resources are still available for new subscriptions.

The resource manager 216 operates to manage device resources for subscription packages that are automatically subscribed to the device. For example, in one embodiment, the server 102 comprises auto-subscribe packages 130 that are automatically subscribed to the device during the activation process, or as the result of some other device interaction with the server 102. The resource manager 216 determines if there are enough resources at the device 106 to accommodate all the services in an auto-subscribe package. For example, the resource manager determines if all the services included in an auto-subscribe package will fit into the portion of the device's memory that is allocated for auto-subscription. If the resource manager 216 determines that the resources are available (i.e., the auto-subscribe package will fit into the available allocated memory), then the resource manager operates to reserve the device's resources necessary to accommodate the auto-subscribe package. Once the device resources have been reserved, the auto-subscription process continues. For example, the auto-subscribe packages 130 are delivered to the device 106 as shown by path 134.

If the resource manager 216 determines that the available device resources cannot accommodate all the services in the auto-subscribe package, then the resource manager 216 operates to automatically exclude selected services until the remaining services in the auto-subscribe package can be accommodated. For example, services within the auto-subscribe package are ranked (or prioritized based on any selectable characteristic) and the lower ranked services are excluded until the resource requirements of the auto-subscribe package is reduced enough that the device resources can accommodate the remaining services in the auto-subscribe package. For example, services in the auto-subscribe package are excluded until the remaining services can fit into the available memory. When enough services have been excluded, the resource manager 216 reserves the necessary device resources and the auto-subscription process continues. As a result, the device 106 is automatically subscribed to the remaining services in the auto-subscribe package.

In another embodiment, the resource manager 216 operates to manage package subscriptions initiated by the user of the device 106. For example, the server 102 comprises user-subscribe packages 132 that are subscribed to the device at the request of the device user, and delivered to the device 106 as shown by path 136. The client 206 displays a list of available service packages to the user of the device 106. The user then selects one or more service packages for subscription. The resource manager 216 operates to verify that the available device resources can accommodate the services offered in the selected packages (i.e., the services will fit into the available memory of the device). If the selected packages can be accommodated, the resource manager 216 reserves the required resources and allows the subscription process to continue. If the selected packages cannot be accommodated, the resource manager 216 notifies the device user and requests adjustments to the subscription selections. The device user may then exclude one or more services from the selected subscription packages to reduce or eliminate resource requirements. Once the resource manager 216 determines that the available device resources can accommodate the services in the selected subscription packages, those resources are reserved and the subscription process continues.

It should be noted that the resource manager 216 operates to manage any device resource. For example, if a particular subscription package comprises selected services that require specialized hardware that the device does not have (i.e., video logic or positioning logic), then the resource manager 216 operates to automatically exclude (or allows the user to exclude) those services from installation on the device.

In one embodiment, the subscription system also operates to unsubscribe services from a device. For example, in one embodiment, the client 206 provides a list of currently subscribed services to the device user. The device user selects one or more services from the list to be unsubscribed. The client 206 operates to notify the distribution server 102 that selected services are to be unsubscribed from the device. In addition, the client 206 notifies the resource manager 216 so that the resources allocated to the unsubscribed services can be freed up for re-allocation to other services. The subscription database 214 is also updated to reflect that selected services have been unsubscribed from the device.

In one embodiment, the client 206 is operational at the device for a selected grace period (i.e., 30 days). For example, when the device is activated, the client 206 operates to provide auto-subscriptions or user initiated subscriptions to the device. If no subscriptions are provided to the device during the grace period, (i.e., no subscription packages are purchased), then the client 206 enters into a sleep mode and is no longer operational on the device. If, in the future, the user attempts to activate the device with the distribution server 102, the client 206 will return to its operational mode from its sleep mode to provide subscriptions as described herein.

Thus, in one or more embodiments, a subscription system is provided that operates to allow a device to subscribe to all or portions of available subscription packages based on the resources available at the device.

Figure 2:
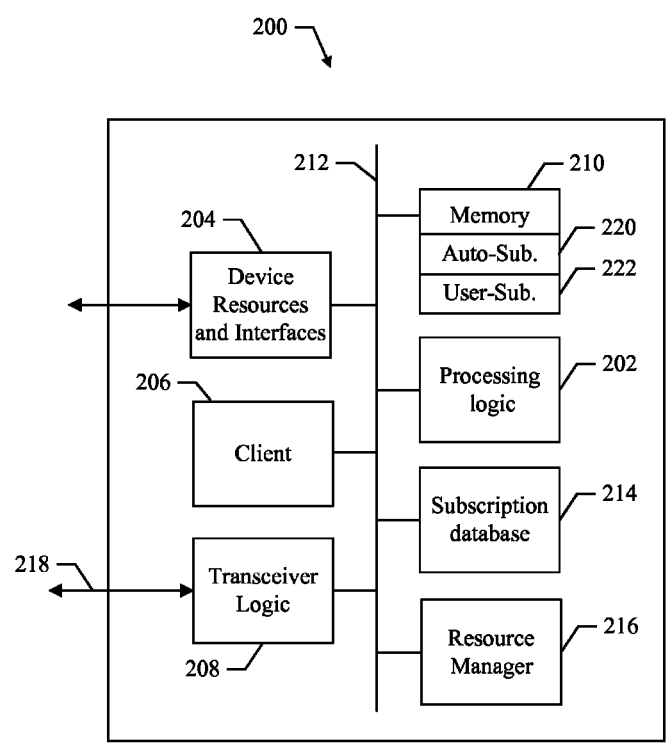
FIG. 2 shows a detailed diagram of one embodiment of a device suitable for use in one embodiment of a subscription system.

FIG. 2 shows one embodiment of a device 200 suitable for use in one embodiment of a subscription system. The device 200 comprises processing logic 202, device resources and interfaces 204, transceiver logic 208, and memory 210 all coupled to a data bus 212. The device 200 also comprises a client 206, a subscription database 214, and a resource manager 216, which are also coupled to the data bus 212.

In one or more embodiments, the processing logic 202 comprises a CPU, processor, gate array, hardware logic, memory elements, virtual machine, software, and/or any combination of hardware and software. Thus, the processing logic 202 generally comprises logic to execute machine-readable instructions and to control one or more other functional elements of the device 200 via the internal data bus 212.

The device resources and interfaces 202 comprise hardware and/or software that allow the device 200 to communicate with internal and external systems. For example, internal systems may include mass storage systems, memory, display driver, modem, positioning logic, or other internal device resources. The external systems may include user interface devices, displays, keyboards, printers, disk drives, or other local devices or systems.

The memory 210 comprises RAM, ROM, Flash and/or any other suitable memory storage device. In one embodiment, the memory 210 comprises a memory portion 220 allocated for auto-subscribed packages, and a memory portion 222 allocated for user-subscribed packages. The processing logic 202 operates to configure the memory 210 and to allocate the memory portions 220 and 222.

The transceiver logic 208 comprises hardware configured, for example with software, so as to allow the device 200 to transmit and receive data other information with external devices or systems using communication channel 218. For example the communication channel 218 may comprise a wireless and/or wired network communication link or any other type of communication link.

During operation, the device 200 is activated with a distribution server to subscribe to available subscription packages according to one or more embodiments of a subscription system. As part of the activation process, the device 200 reserves memory to satisfy an activation memory requirement, which specifies the minimum amount of memory required to store information about the available services and packages. The activation memory requirement imposes only a minimum demand on the available memory resources needed to activate the device 200. This limited storage requirement allows the user to activate the device 200 with the distribution system and browse a program guide that describes the packages and/or services available for subscription without having to make any additional storage allocation decisions.

In one embodiment, the client 206 is downloaded from the distribution server through the transceiver logic 208 using the channel 218. The client 206 comprises any suitable type of hardware/software that executes on the device 200 and communicates with the distribution server through the transceiver logic 208 to complete the activation process. In another embodiment, the client 206 is installed on the device 200 during device manufacture, or may be downloaded from a third party. After activation, the client 206 operates on the device 200 to provide a user interface that displays information to the device user about available subscription packages, or operates to receive various user input.

The resource manager 216 comprises any combination of hardware and software, and operates to verify that available resources exist on the device to accommodate any package that is subscribed to during the subscription process. For example, if a selected auto-subscribe package requires a selected amount of memory, the resource manager 216 operates to determine the memory requirements of the package and verify that enough memory is available at the memory portion 220 before the device subscribes to the package.

The subscription database 212 comprises any type of memory or storage logic suitable for storing information relating to packages/services to which the device 200 has subscribed. For example, the subscription database 212 may comprise package identifiers, service identifiers, size characteristics, resource identifiers, resource allocation requirements, scheduling information, pricing, and/or any other information about the subscription packages to which the device 200 has subscribed.

As part of the activation process, the client 206 operates to receive one or more auto-subscribe packages from the distribution server. An auto-subscribe package comprises services that are to be automatically subscribed to the device 200. In one embodiment, the services are ranked or prioritized based on any selectable characteristic. The resource manager 216 operates to determine if there are enough device resources (i.e., memory) available to allow auto-subscription of an auto-subscribe package to occur. If there are enough resources, then the resource manager 216 reserves the resources and the auto-subscription process proceeds. If there are not enough resources, then the resource manager 216 operates to automatically exclude selected services from the auto-subscribe package based on their ranking. Once enough of the services are excluded so that the available device resources can accommodate the remaining services in the auto-subscribe package, the resource manager 216 reserves those resources and the auto-subscription process is allowed to continue.

Once the activation process is complete, the client 206 operates to provide a user interface (UI) that allows the device user to view the available service packages. The client 206 also allows the device user to select one or more packages for subscription. After the device user selects a package for subscription, the resource manager 216 operates to determine if the available device resources can accommodate the selected package (i.e., will the selected package fit into the user-subscribe memory portion 222). If the device resources can accommodate the selected package, the resource manager 216 operates to reserve the required resources and the user initiated subscription process continues. If the selected package cannot be accommodated, the resource manager 216 notifies the user that there are not enough resources to support the selected package. The user may then select to exclude services in the package, or may select a different subscription package to reduce the device resource requirements so that subscription may occur.

The device 200 performs one or more of the following functions in one or more embodiments of a subscription system. It should be noted that the following functions may be changed, rearranged, modified, added to, or otherwise adjusted within the scope of the embodiments.

1. The device activates with a distribution system.
2. An installed client attempts to auto-subscribe one or more packages.
3. The resource manager controls the auto-subscription process so that only packages that can be accommodated by the available resources will be auto-subscribed. Services within the packages are excluded by ranking if necessary.
4. The client displays a list of available packages to the user.
5. The user selects one or more packages to which the device is to be subscribed.
6. The resource manager controls the user-initiated subscription process so that only packages that can be accommodated by the available resources will be subscribed. Packages or services within the packages are excluded by the user if necessary.

In one embodiment, the subscription system comprises program instructions stored on a computer-readable media, which when executed by a processor, such as the processing logic 202, provides the functions of the subscription system described herein. For example, instructions may be loaded into the device 200 from a computer-readable media, such as a floppy disk, CDROM, memory card, FLASH memory device, RAM, ROM, or any other type of memory device or computer-readable media that interfaces to the device 200 through the device resources 204. In another embodiment, the instructions may be downloaded into the device 200 from a network resource that interfaces to the device 200 through the transceiver logic 208. The instructions, when executed by the processing logic 202, provide one or more embodiments of a subscription system as described herein.

Figure 3:
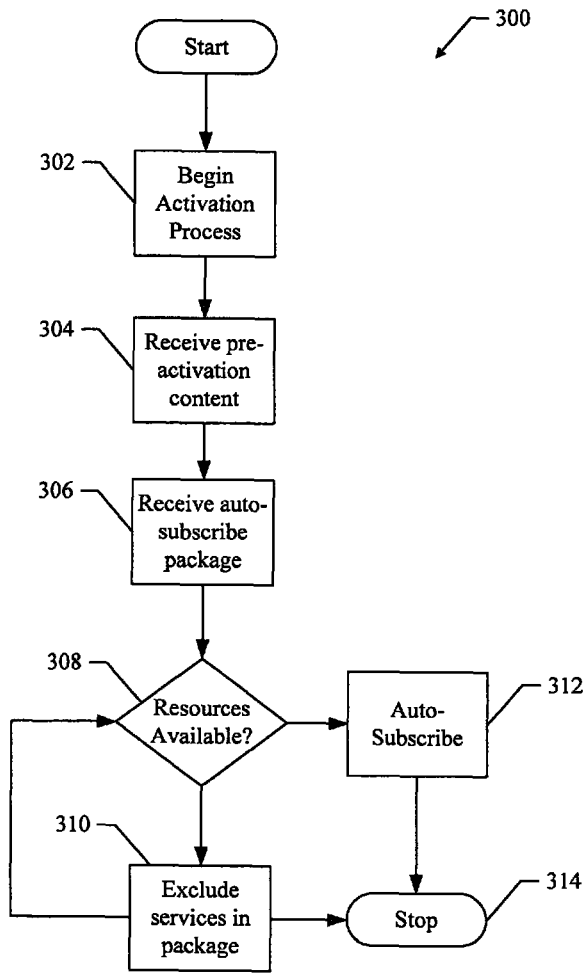
FIG. 3 shows one embodiment of a method for operating a device in one embodiment of a subscription system.

FIG. 3 shows one embodiment of a method 300 for operating a device in one or more embodiments of a subscription system. For clarity, the method 300 will be described with reference to the device 200 shown in FIG. 2. In one or more embodiments, the processing logic 202 executes program instructions to control the device 200 to perform the functions described below.

At block 302, an activation process is performed to activate a device with a distribution server to allow the device to subscribe to available packages. In one embodiment, the processing logic 202 communicates with the distribution server through the transceiver logic 208 and communication channel 218 to provide information for the activation process. During the activation process, the client 206 is installed and executes on the device.

At block 304, the device receives and renders pre-activation content. For example, because the activation process may take a few minutes to complete, the distribution server transmits pre-activation content to the device that is received by the transceiver logic 208 and passed to the device resources and interfaces 204 for rendering on the device during the activation process. In another embodiment, the pre-activation content is stored at the device during device manufacture and rendered during the activation process.

At block 306, the device receives one or more auto-subscribe packages. For example, the transceiver 208 receives an auto-subscribe package from the distribution server for installation on the device. In one embodiment, the transceiver 208 passes the auto-subscribe package to the client 206, which processes the auto-subscribe package to determine its resource requirements and any other information necessary to install the package on the device.

At block 308, a test is performed to determine if there are enough resources available at the device to install the auto-subscribe package. For example, the resource manager 216 receives information about the resource requirements of the auto-subscribe package from the client 206. The resource manager 216 also receives information about the available device resources from the subscription database 214. For example, the subscription database 214 comprises information about packages already subscribed to by the device. The resource manager 216 uses this information to determine if there are enough resources available at the device to install the auto-subscribe package. For example, the resource manager 216 uses the information from the subscription database to determine if there is enough memory at the memory portion 220 to install the auto-subscribe package. If there are enough resources (i.e., memory), the resource manager reserves the resources and the method proceeds to block 312. If there are not enough resources, the method proceeds to block 310.

At block 310, selected services in the auto-subscribe package are automatically excluded from the installation. For example, in one embodiment, the auto-subscribe package comprises multiple services that are ranked by priority. The resource manager 216 operates to automatically exclude selected services based on the priority. For example, starting from the lowest priority, the resource manager 216 excludes a first portion of the services until the available device resources can accommodate the remaining services (second portion of services). It should be noted that the resource manager 216 may use any technique or information to automatically exclude a portion of services from the auto-subscribe package. For example, services may be excluded based on priority, size, date, resource requirements, licensing requirements, price, or any other information or resource characteristic. The method then proceeds to block 308 where the resource requirements of the remaining servicesin the auto-subscribe package are tested. If there are no more remaining services after the automatic exclusion process is performed at block 310, the method proceeds to block 314.

At block 312, the auto-subscribe services that can be accommodated by the device resources will be installed on the device. For example, in one embodiment, the client 206 installs the auto-subscribe services into the memory portion 220, and updates the subscription database 214 to indicate that the memory portion 220 now includes selected services from the auto-subscribe package. The method then ends at block 314.

Thus, the method 300 provides one embodiment of a subscription system that operates to allow a device to subscribe to one or more auto-subscribe packages. It should be noted that the method 300 illustrates just one implementation and that changes, additions, or rearrangements of the functional elements may be made without deviating from the scope of the described embodiments.

Figure 4:
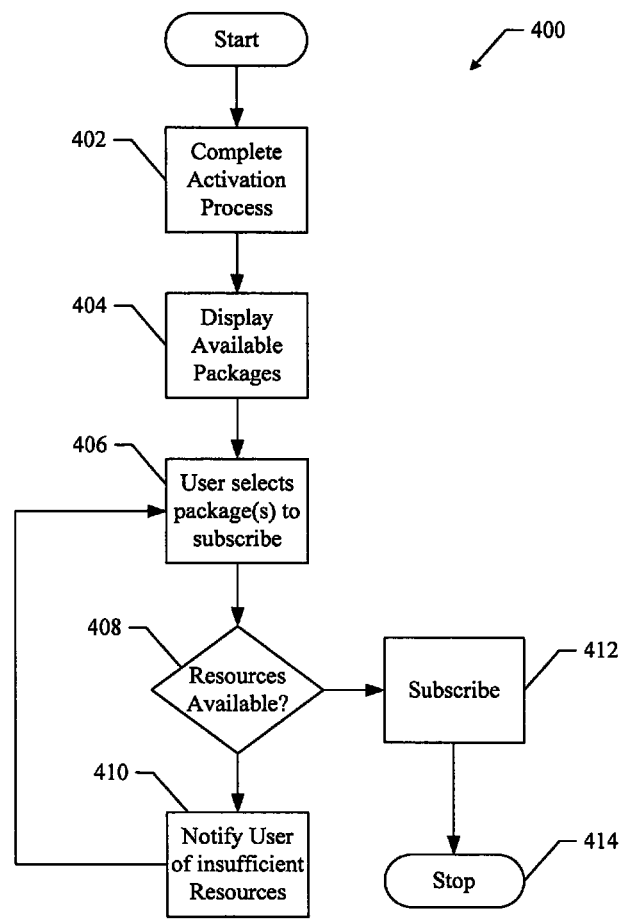
FIG. 4 shows one embodiment of a method for operating a device in one embodiment of a subscription system.

FIG. 4 shows one embodiment of a method 400 for operating a device in one or more embodiments of a subscription system. For clarity, the method 400 will be described with reference to the device 200 shown in FIG. 2. In one or more embodiments, the processing logic 202 executes program instructions to control the device 200 to perform the functions described below.

At block 402, an activation process is completed to activate a device with a distribution server to allow the device to subscribe to available packages. In one embodiment, the processing logic 202 communicates with the distribution server through the transceiver logic 208 and communication channel 218 to complete the activation process. During the activation process, the client 206 is installed and executes on the device. In one embodiment, one or more auto-subscribe packages are installed at the device during the activation process. For example, the method 300 described how in one embodiment, auto-subscribe packages are installed on the device 200.

At block 404, a list of available packages is displayed to the device user. In one embodiment, the client 206 displays on a device display a list of packages available for subscription. For example, the list of packages is part of a program guide installed on the device during the activation process.

At block 406, a device user selects one or more packages for subscription. In one embodiment, the user has the option to select some services within a package for subscription, and to exclude other services from subscription. For example, the user may exclude a first portion of services within a package and thereby subscribe to a second portion of services (i.e., the remaining un-excluded services in the package).

At block 408, a test is performed to determine if there are enough resources available at the device to install the selected packages. For example, the resource manager 216 receives information about the resource requirements of the selected packages from the client 206. The resource manager 216 also receives information about the available device resources from the subscription database 214. The subscription database 214 comprises information about packages already subscribed to by the device. The resource manager 216 uses this information and any other system information as necessary to determine if there are enough available resources at the device to install the selected packages. For example, the resource manager 216 uses the information from the subscription database 214 to determine if there is enough free memory at the memory portion 222 to install the selected packages.

The resource manager 216 may also determine if there are other types of resources available for allocation to the selected packages. For example, the resource manager 216 may obtain any other type of system information to determine if there are available hardware resources, such as a modem, positioning logic, high resolution video display, graphics processor, or any other type of hardware resource. The resource manager 216 may also determine if there are available software resources, such as a particular version of a software module, or a particular type of software driver. If there are enough available resources (i.e., memory, hardware, or software), the resource manager 216 reserves the resources as necessary and the method proceeds to block 412. If there are not enough available resources, the method proceeds to block 410.

At block 410, the user is notified about the insufficient resources available at the device to install the selected packages. For example, in one embodiment, the resource manager 216 notifies the user via a display resource associated with the device resources and interfaces 204. The notification comprises information about the selected packages, required resources, available resources, and any other relevant information. The method then proceeds to block 406 where the device user has the opportunity to change or modify the package selections.

At block 412, the services in the user selected packages that can be accommodated by the device resources will be installed on the device. For example, in one embodiment, the resource manager 216 indicates to the client 206 that resources for the selected packages have been reserved. The client 206 then installs the services into the memory portion 222, and updates the subscription database 214 to indicate that the memory portion 222 now includes services from the user-selected packages. The client 206 also sets up or initializes any other hardware or software device resources and communicates with the distribution server as necessary to complete the subscription of the selected packages. The method then ends at block 414.

Thus, the method 400 provides one embodiment of a subscription system that operates to allow a device user to select and subscribe to one or more subscription packages. It should be noted that the method 400 illustrates just one implementation and that changes, additions, or rearrangements of the functional elements may be made without deviating from the scope of the described embodiments.

Message Flows

The following information describes the flow of messages between a device and a distribution server in one embodiment of a subscription system. The described message flows occur during device activation, package subscription, and subscription modification.

Device Activation

Figure 5:
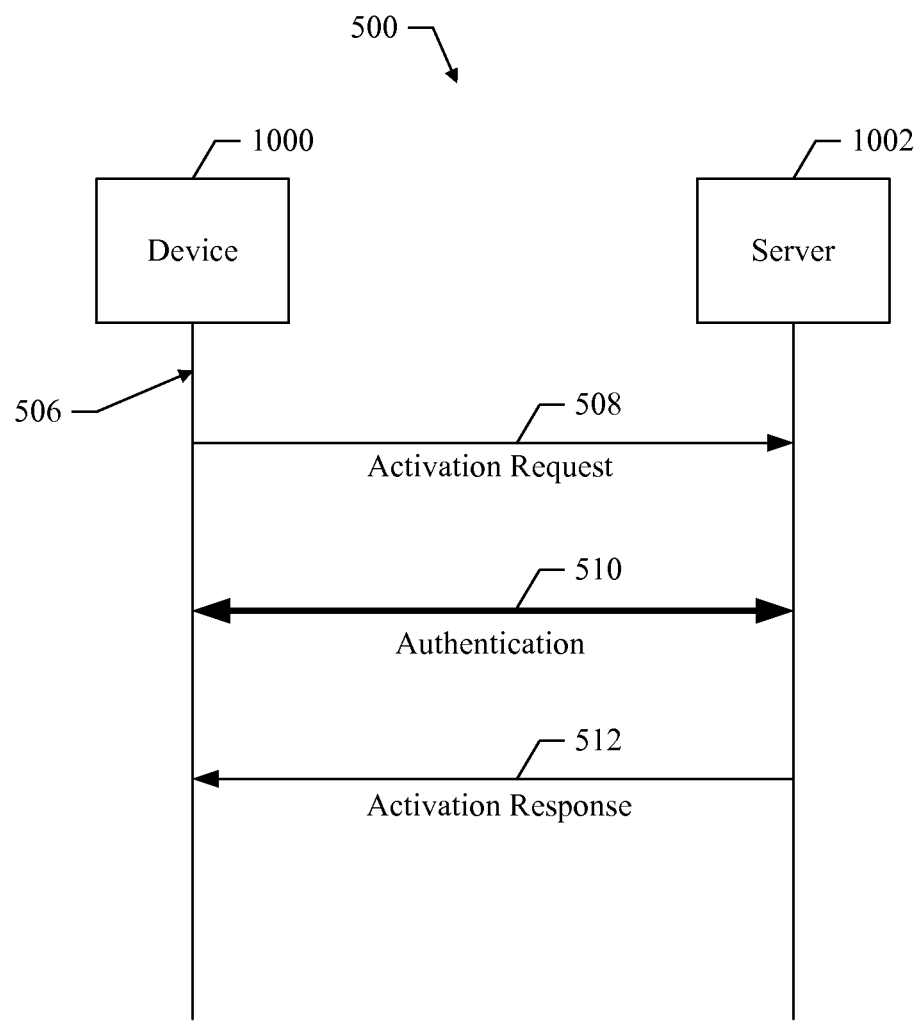
FIG. 5 shows one embodiment of a message flow diagram that illustrates how a device activation is provided in one embodiment of a subscription system.

FIG. 5 shows one embodiment of a message flow diagram 500 that illustrates how a device activation process is provided in one embodiment of a subscription system. The activation process sets a device to a state that allows it to subscribe to available service packages. In one embodiment, the client 206 performs the activation process upon launch of a system application. During the activation process the following messages are exchanged between the device 1000 and a server 1002.

a. The user launches a system application, at a time indicated at 506.

b. The client 206 sends an activation request message 508 to the server 1002.

c. The server 1002 performs an authentication procedure 510 with the device. Upon successful authentication, the server 1002 assigns a subscriber identifier (ID) to the device. A device authentication key specific to the device is generated. This key is shared between the device and distribution servers for authentication of subsequent Device-to-Server transactions.

d. The server 1002 sends an activation response message 512 along with the subscriber ID, device authentication key, and an indicator that indicates to the device that the activation process was successful.

Upon successful activation, the device updates itself with the latest system information and requests other information, such as marketplace definitions, a program guide, and network parameters. At this point, the device is in the "activated" state and ready to subscribe to available services.

Device Subscriptions

Figure 6:
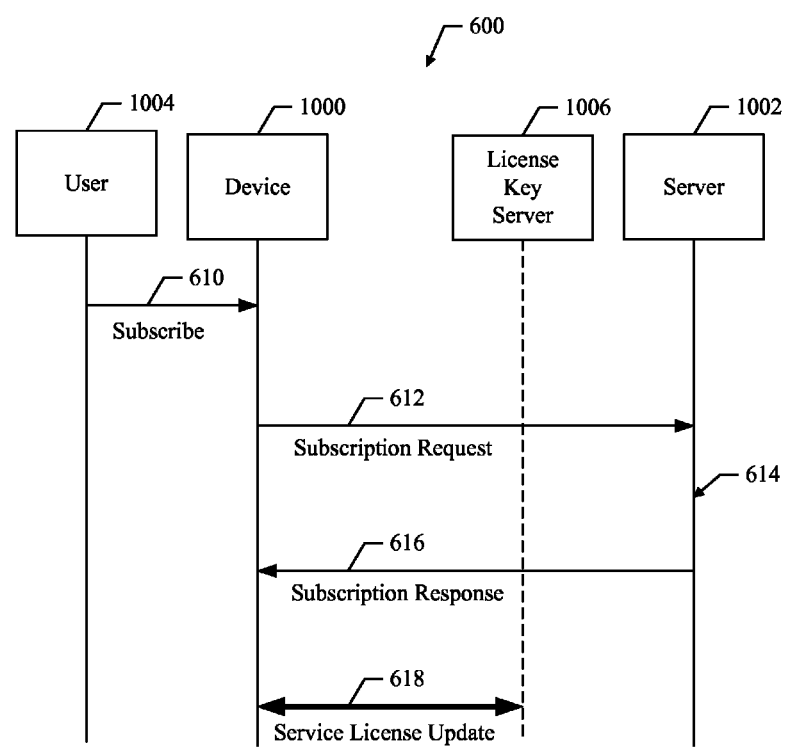
FIG. 6 shows one embodiment of a message flow diagram that illustrates how a device subscription process is provided in one embodiment of a subscription system.

FIG. 6 shows one embodiment of a message flow diagram 600 that illustrates how a device subscription process is provided in one embodiment of a subscription system. Once in the activated state, the device 1000 allows a user 1004 to subscribe to one or more service packages. During the subscription process the following messages are exchanged between the device 1000, a server 1002, and a license server 1006.

a. The user selects one or more service packages for subscription from the user interface on the device 1000, as shown at 610.

b. The device 1000 sends a subscription request message 612 to the server 1002. The subscription request includes a subscriber ID, and package ID(s). The device signs the subscription request message 612 using the device authentication key if the message requires a signature.

c. When the subscription request message 612 is received, the server 1002 authenticates it (at 614) using the digital signature in the message. The server 1002 will also authorize the user.

d. The server 1002 sends a subscription response message 616 to the device 1000 with a success indicator if authentication and authorization are successful.

e. The device 1000 then requests (at 618) an updated service license from the license server 1006. The license server 1006 responds with a service license that contains the subscribed services.

Change in Subscription

Figure 7:
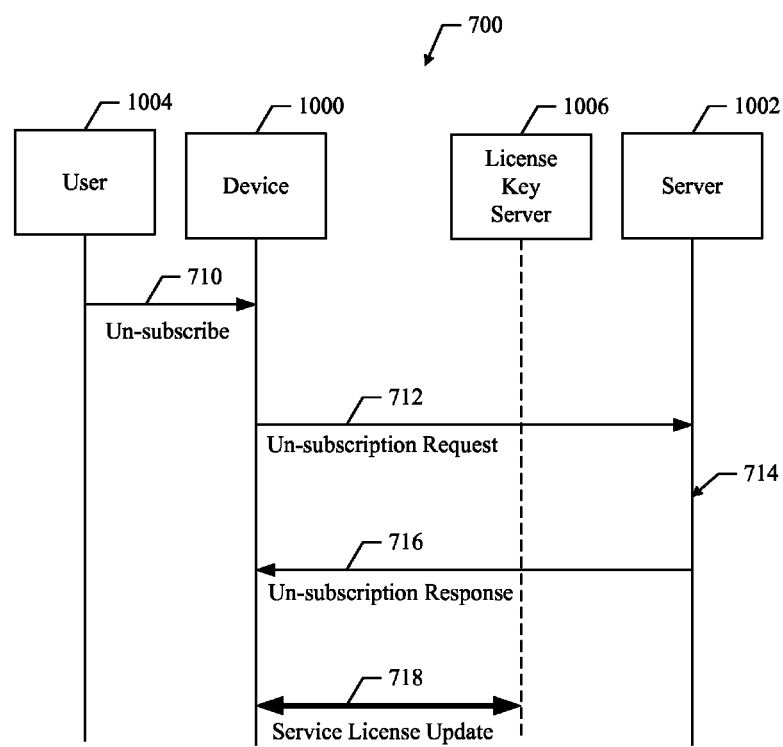
FIG. 7 shows one embodiment of a message flow diagram that illustrates how a device subscription is changed in one embodiment of a subscription system.

FIG. 7 shows one embodiment of a message flow diagram 700 that illustrates how a device subscription is changed in one embodiment of a subscription system. The device user 1004 may change a subscription at any time while the device 1000 is in the "subscribed" state. The user 1004 can add or remove a service package using the user interface on the device 1000. During the change subscription process the following messages are exchanged between the device 1000, a server 1002, and a license server 1006.

a. The user initiates an un-subscription request 710 from the user interface on the device.

b. The device 1000 sends an un-subscription request message 712 to the server 1002. The device 1000 signs the message using its device authentication key.

c. The server 1002 authenticates (at 714) the un-subscription request message 712 using a digital signature in the message. The server 1002 will also authorize the un-subscription request.

d. The server 1002 sends an un-subscription response message 716 to the device 1000 with a success indicator.

e. The device 1000 requests (at 718) an updated service license from the license server 1006.

Unsubscribing from Services

As in subscription, device users can unsubscribe from one or more services or subscription packages. In one embodiment, a device user utilizes the subscription menu on the device to unsubscribe from services. For example, the subscription menu displays a list of installed services and the device user selects one or more services from that list which are to be uninstalled or unsubscribed. Once the device has successfully unsubscribed from a service, the device needs to free the resources associated with the services being unsubscribed. In one embodiment, the resource manager 216 operates to free resources associated with unsubscribed services and update the subscription database 214 to indicate that selected services have been unsubscribed. For example, the resource manager 216 may free memory resources when a service is unsubscribed.

Some subscription packages require prior subscription to a "root package." Generally, the user must first subscribe to the root package before subscribing to "add-on" packages. An add-on package is a subscription package that can be added after the user has successfully subscribed to the root package. The user is not generally allowed to unsubscribe from the root package if the device is subscribed to any add-on packages. In one embodiment, the system operates to allow the user the option of unsubscribing to all packages associated with a particular root package. This will unsubscribe the root and any add-on service packages. In one embodiment, the system operates to prevent the device user from unsubscribing any auto-subscribed packages. Once the user has successfully unsubscribed from a service or service package, any associated content is removed from the device.

Accordingly, while one or more embodiments of a subscription system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for subscribing to receive a subscription package of services at a device in a data network, the method comprising:

receiving, by the device, the subscription package and resource requirements associated with the subscription package, wherein:
the resource requirements indicate resources, comprising an amount of available memory, hardware resources, and software resources, required on the device to render the services associated with the subscription package to a user of the device,
the subscription package comprises a plurality of services offered on a subscription basis and each of the plurality of services comprises a sequence of media presentations delivered to the device for real-time playback, and
receiving, by the device, the subscription package and resource requirements associated with the subscription package comprises beginning an activation process to enable the device to receive the subscription package;

determining, by a resource manager on the device, whether the device meets the resource requirements associated with the subscription package by determining whether the device has each of the amount of available memory, the hardware resources, and the software resources required to accommodate all of the services associated with the subscription package;

excluding from installation on the device one or more services of the subscription package in response to determining that the device does not have each of the amount of available memory, the hardware resources, and the software resources required to accommodate all of the services associated with the subscription package, wherein the plurality of services of the subscription package are ranked based on a priority indicator associated with the each of the one or more services, and wherein a lowest ranked one or more services are excluded from the subscription package such that the device meets the requirements of all of the remaining non-excluded services associated with the subscription package; and automatically subscribing the device to the subscription package by transmitting a subscription request for only the remaining non-excluded services of the subscription package to a distribution server over the data network.

2. The method of claim 1, wherein said excluding comprises excluding services based on user input.

3. The method of claim 1, further comprising outputting, by the resource manager, a notification that the selected resources fail to meet the resource requirements associated with the subscription package.

4. The method of claim 1,
further comprising completing the activation process of the device to enable the device to install the subscription package including the remaining non-excluded services.

5. The method of claim 4, further comprising rendering pre-activation content during the activation process.

6. The method of claim 1, further comprising:
unsubscribing, by the resource manager, from one or more services associated with a subscription package; and
freeing resources associated with the one or more services.

7. A computing device, comprising:
a processor configured with processor-executable instructions to perform operations comprising:
receiving over a data network a subscription package of services and resource requirements associated with the subscription package, wherein:
the resource requirements indicate resources, comprising an amount of available memory, hardware resources, and software resources, required on the computing device to render the services associated with the subscription package to a user of the computing device,
the subscription package comprises a plurality of services offered on a subscription basis and each of the plurality of services comprises a sequence of media presentations delivered to the computing device for real-time playback, and
receiving the subscription package of services and resource requirements associated with the subscription package comprises beginning an activation process to enable the computing device to receive the subscription package;
determining, by a resource manager on the computing device, whether the computing device meets the resource requirements associated with the subscription package by determining whether the computing device has each of the amount of available memory, the hardware resources, and the software resources required to accommodate all of the services associated with the subscription package;
excluding from installation on the computing device one or more services of the subscription package in response to determining that the computing device does not have each of the amount of available memory, the hardware resources, and the software resources required to accommodate all of the services associated with the subscription package, wherein the plurality of services of the subscription package are ranked based on a priority indicator associated with the each of the one or more services, and wherein a lowest ranked one or more services are excluded from the subscription package such that the computing device meets the requirements of all of the remaining non-excluded services associated with the subscription package; and
automatically subscribing the computing device to the subscription package by transmitting a subscription request for only the remaining non-excluded services of the subscription package to a distribution server over the data network.

8. The computing device of claim 7, wherein the processor is configured with processor-executable instructions to perform operations such that said excluding comprises excluding services based on user input.

9. The computing device of claim 7, wherein the processor is configured with processor-executable instructions to perform operations further comprising outputting, by the resource manager, a notification that the selected resources fail to meet the resource requirements associated with the subscription package.

10. The computing device of claim 7, wherein the processor is configured with processor-executable instructions to perform operations further comprising completing the activation process of the computing device to enable the computing device to install the subscription package including the remaining non-excluded services.

11. The computing device of claim 10, wherein the processor is configured with processor-executable instructions to perform operations further comprising rendering pre-activation content during the activation process.

12. The computing device of claim 7, wherein the processor is configured with processor-executable instructions to perform operations further comprising:
unsubscribing, by the resource manager, from one or more services associated with a subscription package; and
freeing resources associated with the one or more services.

13. A non-transitory processor-readable storage medium having stored thereon processor-executable software instructions configured to cause a processor to perform operations for subscribing to receive a subscription package of services at a device in a data network, comprising:
receiving, by the device, the subscription package and resource requirements associated with the subscription package, wherein:
the resource requirements indicate resources, comprising an amount of available memory, hardware resources, and software resources, required on the device to render the services associated with the subscription package to a user of the device,
the subscription package comprises a plurality of services offered on a subscription basis and each of the plurality of services comprises a sequence of media presentations delivered to the device for real-time playback, and
receiving, by the device, the subscription package and resource requirements associated with the subscription package comprises beginning an activation process to enable the device to receive the subscription package;
determining, by a resource manager on the device, whether the device meets the resource requirements associated with the subscription package by determining whether the device has each of the amount of available memory, the hardware resources, and the software resources required to accommodate all of the services associated with the subscription package;
excluding from installation on the device one or more services of the subscription package in response to determining that the device does not have each of the amount of available memory, the hardware resources, and the software resources required to accommodate all of the services associated with the subscription package, wherein the plurality of services of the subscription package are ranked based on a priority indicator associated with the each of the one or more services, and wherein a lowest ranked one or more services are excluded from the subscription package such that the device meets the requirements of all of the remaining non-excluded services associated with the subscription package; and
automatically subscribing the device to the subscription package by transmitting a subscription request for only the remaining non-excluded services of the subscription package to a distribution server over the data network.

14. The non-transitory processor-readable storage medium of claim 13, wherein the stored processor-executable software instructions are configured to cause a processor to perform operations such that said excluding comprises excluding services based on user input.

15. The non-transitory processor-readable storage medium of claim 13, wherein the stored processor-executable software instructions are configured to cause a processor to perform operations further comprising outputting, by the resource manager, a notification that the selected resources fail to meet the resource requirements associated with the subscription package.

16. The non-transitory processor-readable storage medium of claim 13, wherein the stored processor-executable software instructions are configured to cause a processor to perform operations further comprising completing the activation process of the device to enable the device to install the subscription package including the remaining non-excluded services.

17. The non-transitory processor-readable storage medium of claim 16, wherein the stored processor-executable software instructions are configured to cause a processor to perform operations further comprising rendering pre-activation content during the activation process.

18. The non-transitory processor-readable storage medium of claim 13, wherein the stored processor-executable software instructions are configured to cause a processor to perform operations further comprising:
unsubscribing, by the resource manager, from one or more services associated with a subscription package; and
freeing resources associated with the one or more services.

19. A computing device, comprising:
means for receiving over a data network a subscription package of services and resource requirements associated with the subscription package, wherein:
the resource requirements indicate resources, comprising an amount of available memory, hardware resources, and software resources, required on the computing device to render the services associated with the subscription package to a user of the computing device,
the subscription package comprises a plurality of services offered on a subscription basis and each of the plurality of services comprises a sequence of media presentations delivered to the computing device for real-time playback, and
means for receiving the subscription package and resource requirements associated with the subscription package comprises means for beginning an activation process to enable the computing device to receive the subscription package;
means for determining, by a resource manager on the computing device, whether the computing device meets the resource requirements associated with the subscription package by determining whether the computing device has each of the amount of available memory, the hardware resources, and the software resources required to accommodate all of the services associated with the subscription package;

means for excluding from installation on the computing device one or more services of the subscription package in response to determining that the computing device does not have each of the amount of available memory, the hardware resources, and the software resources required to accommodate all of the services associated with the subscription package, wherein the plurality of services of the subscription package are ranked based on a priority indicator associated with the each of the one or more services, and wherein a lowest ranked one or more services are excluded from the subscription package such that the computing device meets the requirements of all of the remaining non-excluded services associated with the subscription package; and means for automatically subscribing the computing device to the subscription package by transmitting a subscription request for only the remaining non-excluded services of the subscription package to a distribution server over the data network.

20. The computing device of claim 19, wherein said means for excluding comprises means for excluding services based on user input.

21. The computing device of claim 19, further comprising means for outputting, by the resource manager, a notification that the selected resources fail to meet the resource requirements associated with the subscription package.

22. The computing device of claim 19, further comprising means for completing the activation process of the computing device to enable the computing device to install the subscription package including the remaining non-excluded services.

23. The computing device of claim 22, further comprising means for rendering pre-activation content during the activation process.

24. The computing device of claim 19, further comprising:
means for unsubscribing, by the resource manager, from one or more services associated with a subscription package; and
means for freeing resources associated with the one or more services.

* * * * *